US012756212B2

(12) United States Patent
He et al.

(10) Patent No.: US 12,756,212 B2
(45) Date of Patent: Oct. 6, 2026

(54) ELECTRONIC DEVICE WITH DYNAMICALLY ADJUSTED SHUTDOWN VOLTAGE

(71) Applicant: Apple Inc., Cupertino, CA (US)

(72) Inventors: Wei He, San Jose, CA (US); Guangyu Liu, San Jose, CA (US); Tianheng Feng, Cupertino, CA (US); Tai-sik Hwang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 606 days.

(21) Appl. No.: 18/458,964

(22) Filed: Aug. 30, 2023

(65) Prior Publication Data

US 2024/0088681 A1 Mar. 14, 2024

Related U.S. Application Data

(60) Provisional application No. 63/403,174, filed on Sep. 1, 2022.

(51) Int. Cl.

*H02J 7/63* (2026.01)
*G06Q 20/32* (2012.01)
*H02J 7/00* (2006.01)
*H02J 7/82* (2026.01)

(52) U.S. Cl.

CPC .............. *H02J 7/63* (2026.01); *G06Q 20/322* (2013.01); *H02J 7/82* (2026.01); *H02J 7/855* (2026.01)

(58) Field of Classification Search

CPC .... H02J 7/63; H02J 7/82; H02J 7/855; G06Q 20/322
USPC .......................................................... 320/136
See application file for complete search history.

(56) References Cited

U.S. PATENT DOCUMENTS

2012/0153960 A1* 6/2012 Wortham ........... G01R 31/3828 324/426
2015/0119094 A1* 4/2015 Bartels ............. H04W 52/0261 455/518
2018/0345812 A1 12/2018 Chaturvedi et al.
2020/0052494 A1* 2/2020 Matsumura ............... H02J 7/82

* cited by examiner

*Primary Examiner* — Daniel A Hess
(74) *Attorney, Agent, or Firm* — BakerHostetler

(57) ABSTRACT

The disclosed technology relates to a portable electronic device. The portable electronic device may comprise a battery, a battery controller, and a system controller. The battery controller may be configured to determine real time battery state information associated with the battery, the real time battery state information including a system load current draw, a battery age indicator, and a battery temperature. The system controller may be configured to determine a user initiated current low voltage mode state of the portable electronic device of a plurality of low voltage mode states, receive current battery state information from the battery controller, and adaptively generate a real time shutoff voltage threshold based on the current determined low voltage mode state and the current battery state information.

20 Claims, 5 Drawing Sheets

ELECTRONIC DEVICE WITH DYNAMICALLY ADJUSTED SHUTDOWN VOLTAGE

PRIORITY

This patent application claims the benefit under 35 U.S.C. § 119(e) of U.S. Patent Application No. 63/403,174, entitled "Electronic Device with Dynamically Adjusted Shutdown Voltage," filed on Sep. 1, 2022, the contents of which are incorporated herein by reference in its entirety.

TECHNICAL FIELD

The present disclosure relates generally to electronic devices, and more particularly, to an electronic device having a dynamically adjusted shutdown voltage.

BACKGROUND

Electronic devices may be powered by a battery with certain power capabilities. The system may shut down when the battery is no longer be able to support the power required by the system. For example, the system may shut down when the battery's voltage reaches a predetermined shutdown voltage. The predetermined shutdown voltage may be the voltage at which the battery is considered fully discharged, as any further discharge may cause the voltage to drop below the minimum usable voltage for the system and/or damage the battery. However, shutting the system down when the battery's voltage reaches the predetermined shutdown voltage may, in some cases, cause the system to be shut down prematurely.

SUMMARY

The disclosed embodiments provide for a portable electronic device with a dynamically adjusted shutdown voltage. The portable electronic device includes a battery, a battery controller, and a system controller. The battery controller is configured to determine real time battery state information associated with the battery. The real time battery state information includes a system load current draw, a battery age indicator, and a battery temperature. The system controller is configured to determine a user initiated current low voltage mode state of the portable electronic device of a plurality of low voltage mode states, receive current battery state information from the battery controller, and adaptively generate a real time shutoff voltage threshold based on the current determined low voltage mode state and the current battery state information.

In some embodiments, a system controller for use in a portable electronic device is disclosed. The system controller is configured to determine a user initiated current low voltage mode state of the portable electronic device of a plurality of low voltage mode states. The system controller is configured to receive current battery state information from a battery controller. The battery controller is configured to determine real time battery state information including a system load current draw, a battery age indicator, and a battery temperature. The system controller is configured to adaptively generate a real time shutoff voltage threshold based on the current determined low voltage mode state and the current battery state information.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Batteries are used to provide power to one or more components of portable electronic devices. A battery's depth of discharge (DOD) indicates the percentage of the battery that has been discharged relative to the overall capacity of the battery. Over time, as a battery continues to provide power to the portable electronic device's component(s), the DOD of the battery may increase. Eventually, when the DOD becomes high enough, the battery may no longer able to support the power required by the system.

If the battery is no longer able to support the power required by the system, the system may need to shut down. A shutdown voltage is an estimated voltage at which the battery is considered fully discharged (e.g., DOD has reached its recommended maximum), beyond which further discharge could cause harm. The system may initiate shutdown procedures when the battery's voltage reaches a predetermined static shutdown voltage. However, shutting the system down when the battery's voltage reaches the predetermined static shutdown voltage may cause the system to shut down too early (e.g., while the battery is still able to support the power required by the system).

Accordingly, techniques are needed for dynamically adjusting the shutdown voltage of a portable electronic device. The disclosed technology addresses the foregoing limitations of conventional static shutdown voltages by introducing a system controller that can dynamically determine a real-time shutdown voltage based on current battery state information and a current a user initiated low voltage mode state.

By dynamically determining a real-time shutdown voltage, just enough energy (not too much, or too little) will be reserved to power one or more features corresponding to the user initiated low voltage mode state while still ensuring a graceful shutdown of the device. Compared to conventional static shutdown voltages, the dynamically determined shutdown voltage described herein may improve the portable electronic device's run time, may improve the consistency of the low voltage mode state run time, and/or may prevent brownouts or unexpected power offs of the portable electronic device.

Figure 1:
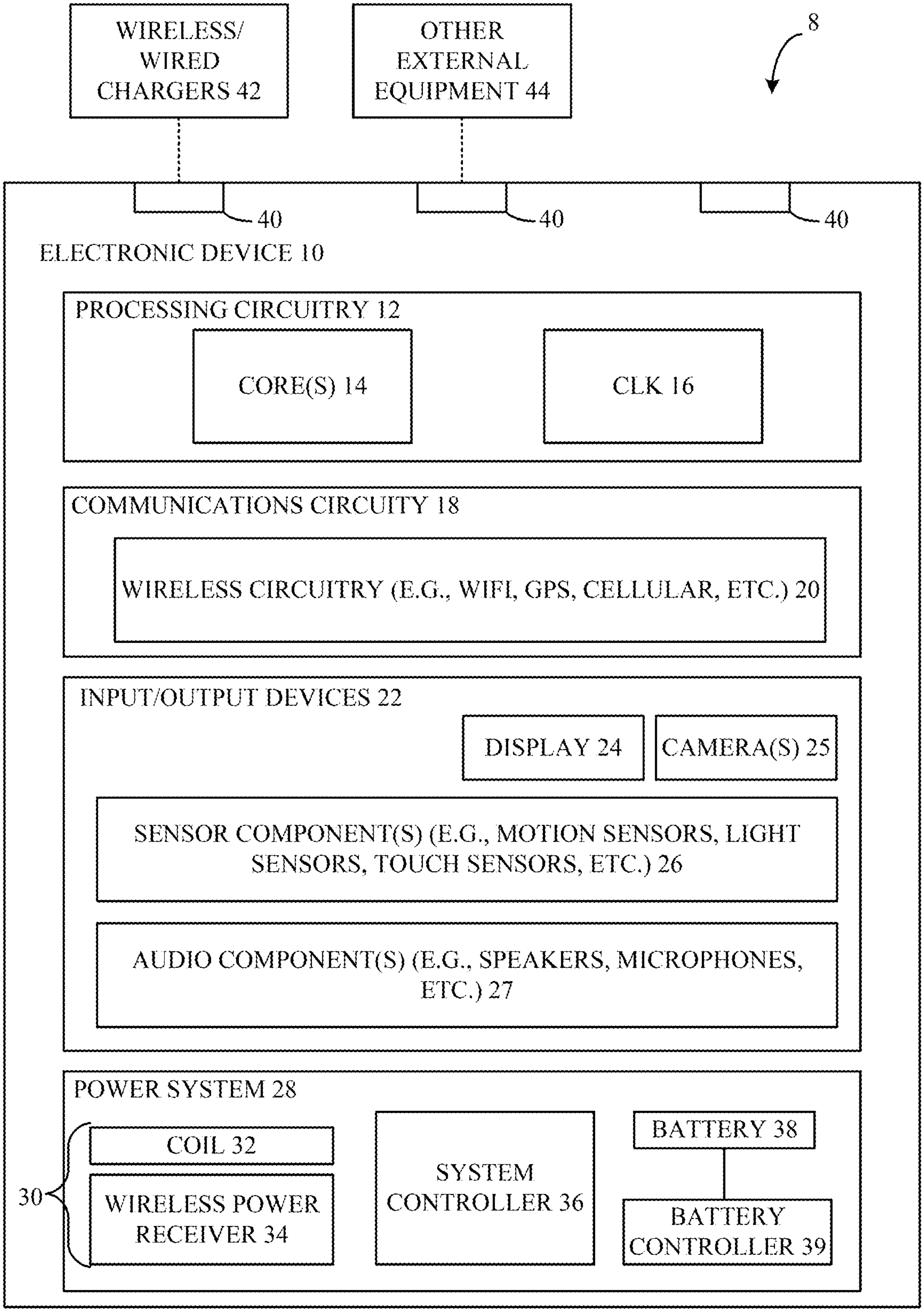
FIG. 1 is a schematic diagram of an illustrative system including an electronic device with a battery.

An illustrative system that includes an electronic device with a battery is shown in FIG. 1. As shown in FIG. 1, system 8 includes electronic devices such as device 10. Device 10 has battery 38. Device 10 may be a cellular telephone, a computer (e.g., a tablet computer or laptop computer), a wristwatch device or other wearable equipment, and so forth. Illustrative configurations in which device 10 is a portable electronic device may sometimes be described herein as an example.

As shown in FIG. 1, exemplary device 10 has processing circuitry 12. Processing circuitry 12 may include processing circuitry associated with microprocessors, power management units (PMUs), baseband processors, digital signal processors, microcontrollers, and/or application-specific integrated circuits with processing circuits. Processing circuitry 12 implements desired control and communications features in device 10. For example, processing circuitry 12 may be used in determining power transmission levels, processing sensor data, processing user input, and processing other information and using this information to adjust the operation of device 10. Processing circuitry may be used to authorize components to use power and ensure that components do not exceed maximum allowable power consumption levels. Processing circuitry 12 may be configured to perform these operations using hardware (e.g., dedicated hardware or circuitry), firmware and/or software. Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid-state drives), one or more removable flash drives or other removable media, or the like. Software stored on the non-transitory computer readable storage media may be executed on the processing circuitry of processing circuitry 12. The processing circuitry may include application-specific integrated circuits with processing circuitry, one or more microprocessors, a central processing unit (CPU) or other processing circuitry.

Processing circuitry 12 may have adjustable hardware resources. For example, processing circuitry 12 may include multiple processing cores 14 that can be selectively switched into or out of use. Processing circuitry 12 may also have clock circuitry such as clock circuitry 16. Clock circuitry 16 may supply an adjustable processor clock (e.g., a processor clock with a frequency that can be adjusted between a low frequency $f_1$ to conserve power and a high frequency $f_2$ to enhance processing speed). Clock circuitry 16 may also maintain information on the current time of day and date for device 10.

Device 10 has communications circuitry 18. Communications circuitry 18 may include wired communications circuitry (e.g., circuitry for transmitting and/or receiving digital and/or analog signals via a port associated with a connector 40) and may include wireless communications circuitry 20 (e.g., radio-frequency transceivers and antennas) for supporting communications with wireless equipment. Wireless communications circuitry 20 may include wireless local area network circuitry (e.g., WiFi® circuitry), cellular telephone transceiver circuitry, satellite positioning system receiver circuitry (e.g., a Global Positioning System receiver for determining location, velocity, etc.), near-field communications circuitry and/or other wireless communications circuitry.

Device 10 uses input-output devices 22 to receive input from a user and the operating environment of device 10 and to provide output. Input-output devices 22 may include one or more visual output devices such as display 24 (e.g., a liquid crystal display, an organic light-emitting diode display, or other display). Display 24 may be a touch-sensitive display. Input-output devices 22 include one or more sensors for receiving input from a user or determining the operating environment of the device. Sensors 26 in input-output devices 22 may include force sensors, touch sensors, capacitive proximity sensors, optical proximity sensors, ambient light sensors, temperature sensors, air pressure sensors, gas sensors, particulate sensors, magnetic sensors, motion and orientation sensors (e.g., inertial measurement units based on one or more sensors such as accelerometer, gyroscopes, and magnetometers), strain gauges, etc. Input-output devices 22 may include one or more cameras 25 for capturing images. Device 10 may have a front-facing camera and a rear-facing camera, as an example. Each camera in device 10 may have a corresponding camera flash for illuminating the imaged scene. Input-output devices 22 may include audio input-output devices 27 such as speakers and microphones used to capture audio input and generate audio for the user. Input-output devices 22 may also include buttons, joysticks, scrolling wheels, touch pads, keypads, keyboards, tone generators, vibrating components (e.g., piezoelectric vibrating components, etc.), light-emitting diodes and other status indicators, data ports, etc.

Device 10 may interact with equipment such as charging system 42 (sometimes referred to as a charging mat, charging puck, power adapter, etc.). Device 10 may also interact with other external equipment 44 (e.g., an accessory battery case, earphones, network equipment, etc.). Charging system 42 may include wired power circuitry and/or wireless power circuitry. For example, charging system 42 may include a wired power source that provides direct-current power to device 10 from a mains power supply (e.g., charging system 42 may include an alternating-current-to-direct current adapter, etc.). Direct-current power may also be supplied to device 10 from a battery case or other external equipment 44 plugged into a port associated with a connector such as one of connectors 40 in device 10 or other equipment for supplying power such as direct-current power over a cable or other wired link coupled to connector 40. If desired, charging system 42 may include wireless power transmitting circuitry for supplying wireless power to device 10. Wireless power transmitting circuitry in charging system 42 may, for example, include an oscillator and inverter circuitry that drives a signal into a coil and thereby causes the coil to produce electromagnetic fields that are received by a corresponding coil in device 10 (see, e.g., coil 32 and associated wireless power receiver 34 in wireless power receiver circuitry 30). Configurations in which wireless power is transmitted using capacitive coupling arrangements, near-field wireless power transmissions, and/or other wireless power arrangements may also be used. The use of an inductive wireless power arrangement in which charging system 42 and device 10 support inductive power transfer is merely illustrative.

Using communications circuitry 18, device 10 can communicate with external equipment such as equipment 44. Equipment 44 may include accessories that can be communicatively coupled to device 10 (e.g., ear buds, covers, keyboards, mice, displays, etc.), may include wireless local area network equipment and/or other computing equipment that interacts with device 10, may include peer devices (e.g., other devices such as device 10), may include covers, cases, and other accessories with optional supplemental batteries, and/or may include other electronic equipment.

Device 10 includes power circuitry such as power system 28. Power system 28 includes a battery such as battery 38. Battery 38 of device 10 may be used to power device 10 when device 10 is not receiving wired or wireless power from another source. In some configurations, device 10 may use battery power associated with an accessory (e.g., external equipment 44). In other configurations, battery 38 of device 10 may be used to supply power to external equipment 44. Charging system 42 may also power device 10 using wired or wireless power.

Power system 28 may be used in receiving wired power from an external source (e.g., charging system 42 or a battery case) and/or may include wireless power receiving circuitry 30 for receiving wirelessly transmitted power from a corresponding wireless power transmitting circuit in charging system 42. Wireless power receiving circuitry 30 may, as an example, include a coil such as coil 32 and an associated wireless power receiver 34 (e.g., a rectifier). During operation, coil 32 may receive wirelessly transmitted power signals and wireless power receiver 34 may convert these received signals into direct-current power for device 10.

System controller 36 may be used for power management in power system 28. For example, system controller 36 may control the power flow within the device 10. During operation, system controller 36 may distribute received power (i.e., wired or wireless power from charging system 42) to internal circuitry in device 10 and/or to battery 38 (e.g., to charge battery 38). System controller 36 may also distribute power from battery 38 to internal circuitry in device 10 or to external equipment such as external equipment 44. System controller 36 may additionally be used to control thermal, fans, and related components.

Battery controller 39 in power system 28 obtains measurements from battery 38 in order to determine properties of the battery in real time. For example, battery controller 39 may include a voltage sensor (sometimes referred to as a voltmeter) that is configured to measure a voltage associated with the battery, a current sensor (sometimes referred to as an ammeter) that is configured to measure a current associated with the battery, an impedance sensor that is configured to measure a battery age (e.g., impedance) associated with the battery, and a temperature sensor that is configured to measure a temperature associated with the battery.

Battery controller 39 may use these sensors to determine properties of the battery. For example, the voltage sensor may determine the voltage of the battery. The voltage of the battery may be used to help determine a state of charge (SOC) of the battery (i.e., an assessment of the battery charge level as a percentage). The current sensor may measure a load applied to the battery (i.e., current drawn to operate components in the electronic device). The impedance sensor may measure an impedance of the battery. The impedance of the battery may indicate an age of the battery. For example, an older battery may have a higher impedance. The temperature sensor may measure a temperature associated with the battery. One or more temperature sensors may be formed in the interior of the electronic device, in a thermally isolated region of the electronic device, on the exterior of the electronic device, or other desired locations. Temperature sensors on the exterior of the device may measure environmental conditions of the electronic device. Temperature sensors in the interior of the electronic device may measure the temperature of the battery itself. Multiple temperature sensors may be included to account for situations in which the temperature of the battery is non-uniform (i.e., the battery has temperature gradients or hotspots).

Figure 2:
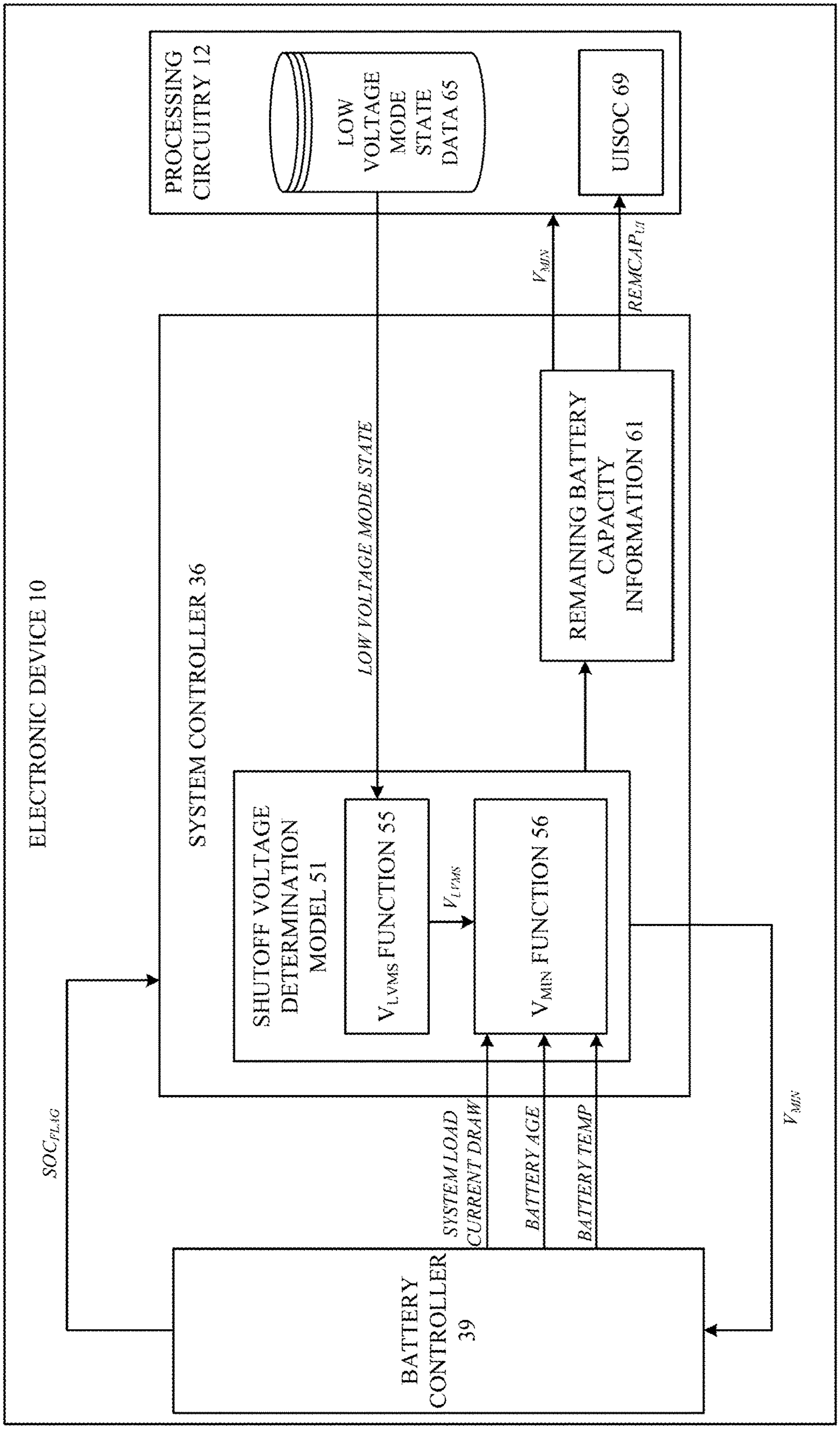
FIG. 2 is another schematic diagram of an illustrative system including the electronic device of FIG. 1.

Another illustrative system that includes device 10 is shown in FIG. 2. As described above with regard to FIG. 1, device 10 includes battery controller 39, system controller 36, and processing circuitry 12.

In certain embodiments, one or more components of processing circuitry 12 may be configured to store low voltage mode state data 65. The low voltage mode state data 65 may indicate a user initiated current low voltage mode state of device 10. For example, the user initiated current low voltage mode state of device 10 may have been selected by a user of electronic device via display 24. The user initiated current low voltage mode state of device 10 may have been selected from a plurality of low voltage mode states of device 10.

Each of the plurality of low voltage mode states of device 10 corresponds to a state in which device 10 provides at least one specific function after system shutdown. The at least one specific function may, for example, cause device 10 to enable a user (e.g., give the user the ability) to access a car, a building, and/or a house using device 10 after device 10 has shut down. As another example, the at least one specific function may cause device 10 to enable a user to locate device 10 using another device after device 10 has shut down. For example, a user may be able to view, on a display of another device, a geographic location of device 10 after device 10 has shut down. As another example, the at least one specific function may cause device 10 to enable a user to make a mobile payment with device 10 after device 10 has shut down.

A user of device 10 may select one or more of the low voltage mode states of device 10. For example, if the user wants the ability to access a car, a building, and/or a house using device 10 after device 10 has shut down, the user may select the low voltage mode state that enables the user to access a car, a building, and/or a house using device 10 after device 10 has shut down. If the user wants to be able to locate device 10 using another device after device 10 has shut down, the user may select the low voltage mode state that enables the user to locate device 10 using another device after device 10 has shut down. If the user wants to be able to make a mobile payment with device 10 after device 10 has shut down, the user may select the low voltage mode state that enables the user to make a mobile payment with device 10 after device 10 has shut down.

The user may select any number (zero or more) of low voltage mode states from the plurality of low voltage mode states. Data indicating which (if any) low voltage mode states have been selected by the user may be stored as low voltage mode state data 65. At any time, the user may de-select a low voltage mode state that was previously selected by the user. Likewise, the user may select new low voltage mode state(s) that were not previously selected by the user. The low voltage mode state data 65 may be updated each time the user's selected low voltage mode state(s) are modified.

Information captured by battery controller 39 and low voltage mode state data 65 are both used by device 10 (i.e., by a shutoff voltage determination model 51 of system controller 36) to dynamically determine a real-time shutdown voltage of device 10.

The system controller 36 may determine the current user initiated low voltage mode state of device 10. For example, the system controller 36 may receive or retrieve low voltage mode state data 65. Low voltage mode state data 65 may indicate which low voltage mode state(s), if any, are currently selected by a user of device 10. Shutoff voltage determination model 51 of the system controller 36 may determine an amount of voltage, $V_{LVMS}$, that is sufficient (e.g., needs to be reserved) for continued operation of the currently selected low voltage mode state of device 10 after shutdown. For example, the shutoff voltage determination model 51 of the system controller 36 may evaluate a function 55 to determine a current $V_{LVMS}$. The currently selected low voltage mode state of device 10 may constitute one or more input variables in the function 55. The output of function 55 may be the current $V_{LVMS}$.

Certain low voltage mode states of device 10 require a greater percentage of reserved battery capacity to operate after shutdown of device 10 than other low voltage mode states of device 10. For example, the low voltage mode state that enables the user to access a car, a building, and/or a house using device 10 after device 10 has shut down may require a greater percentage of reserved battery capacity than the low voltage state that enables the user to locate device 10 using another device after device 10 has shut down. For example, the low voltage mode state that enables the user to access a car, a building, and/or a house using device 10 after device 10 has shut down may require 3.5 volts of reserved power, while the low voltage state that enables the user to locate device 10 using another device after device 10 has shut down may require only 0.2 volts of reserved power.

Thus, the value of the current $V_{LVMS}$ is dependent on which low voltage mode state(s) are currently selected by the user. If the user's selected low voltage mode state(s) are modified, the low voltage mode state data 65 may automatically be modified, and $V_{LVMS}$ may increase or decrease accordingly.

As described above, battery controller 39 obtains measurements from battery 38 in order to determine properties of battery 38 in real time. For example, battery controller 39 may determine real time battery state information including a system load current draw, a battery age (e.g., impedance), and a battery temperature. System controller 36 may receive the real time battery state information from battery controller 39.

Shutoff voltage determination model 51 of system controller 36 may utilize the real time battery state information received from battery controller 39 and the current $V_{LVMS}$ to generate a real time shutoff voltage threshold, $V_{MIN}$. The real time battery state information received from battery controller 39 and $V_{LVMS}$ may constitute one or more input variables for a function 56. The function 56 may be evaluated by shutoff voltage determination model 51 to determine $V_{MIN}$. $V_{MIN}$ may be directly proportional to the current $V_{LVMS}$, inversely proportional to the system load current draw (e.g., the higher the system load current draw, the lower $V_{MIN}$), directly proportional to the battery age, and inversely proportional to the battery temperature. Shutoff voltage determination model 51 may evaluate the function 56 given the current real time battery state information and the current $V_{LVMS}$ to determine the current real time shutoff voltage threshold, $V_{MIN}$.

After determining $V_{MIN}$, the system controller 36 may send information 61 about a remaining usable battery capacity to the processing circuitry 12. The processing circuitry 12 may be configured to convert the information 61 to a user-interface friendly percentage 69. For example, the percentage 69 may indicate that the device 10 has a certain percentage of battery capacity (e.g., 10%, 20%, 30%, etc.) remaining. The percentage 69 may be displayed via display 24.

System controller 36 may send (e.g., provide, forward) information indicative of $V_{MIN}$ to battery controller 39. Battery controller 39 may receive and/or store the information indicative of $V_{MIN}$. Battery controller 39 may then repeatedly compare a current load voltage of battery 38 to $V_{MIN}$. If battery controller 39 determines that the current load voltage of battery 38 is equal to or has fallen below $V_{MIN}$, battery controller 39 may send a notification, $SOC_{FLAG}$, to system controller 36. $SOC_{FLAG}$ may indicate to system controller 36 that the current load voltage of battery 38 is equal to or has fallen below $V_{MIN}$. In response to receiving $SOC_{FLAG}$, system controller 36 may initiate system shutdown procedures.

The above-described process may be continually repeated so that $V_{MIN}$ is always reflective of the current $V_{LVMS}$ and the current real time battery state information. Because $V_{MIN}$ is a function of the current real time battery state information and the current $V_{LVMS}$, the value of $V_{MIN}$ changes as the current $V_{LVMS}$ changes and/or the current real time battery state information changes.

In certain embodiments, shutoff voltage determination model 51 receives an indication each time low voltage mode state data 65 is modified. When shutoff voltage determination model 51 receives an indication that low voltage mode state data 65 has been modified, shutoff voltage determination model 51 may determine, using function 55, a new $V_{LVMS}$ based on the updated low voltage mode state data 65. The new $V_{LVMS}$ may replace the previous $V_{LVMS}$ as an input variable in function 56. In this manner, shutoff voltage determination model 51 may be specifically adapted to the currently determined low mode state of device 10.

In certain embodiments, shutoff voltage determination model 51 may continually receive real time battery state information from battery controller 39. The real time battery state information may change over time. For example, one or more of the current draw, the battery age, and/or the battery temperature may change (e.g., increase or decrease) over time. As $V_{MIN}$ is a function of the current draw, the battery age, and the battery temperature, the value of $V_{MIN}$ will change as the current draw, the battery age, and/or the battery temperature change.

Shutoff voltage determination model 51 may repeatedly (e.g., adaptively, continually, dynamically) generate $V_{MIN}$ using function 56 so that $V_{MIN}$ is always reflective of the current real time battery state information and the current $V_{LVMS}$. Shutoff voltage determination model 51 may repeatedly send $V_{MIN}$ to battery controller 39 so that battery controller 39 is always aware of the most current $V_{MIN}$.

Figure 3:
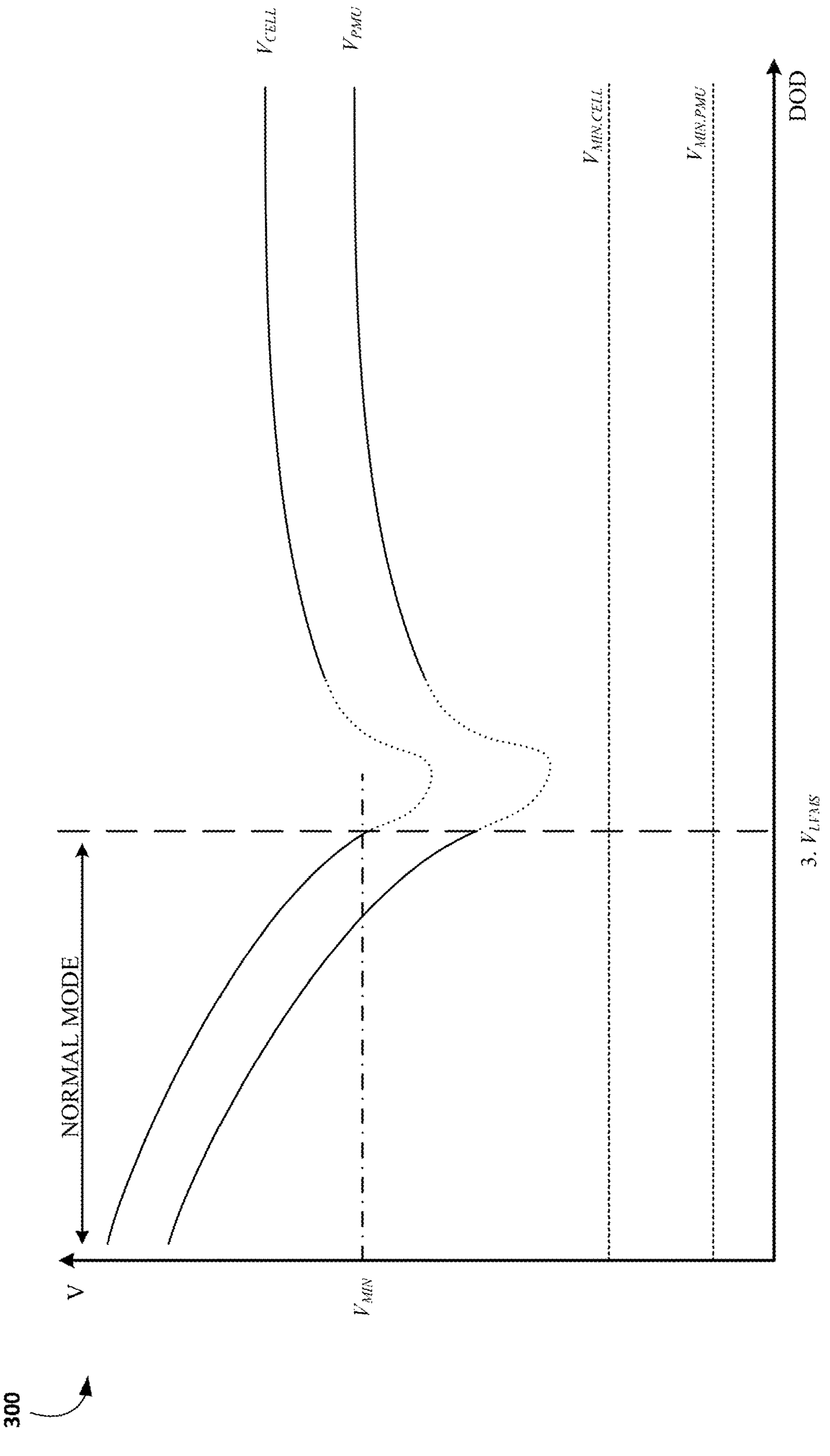
FIG. 3 is a graph illustrating voltage of an electronic device as a function of depth of discharge (DoD).

FIG. 3 is a graph 300 illustrating voltage (V) of battery 38 as a function of DOD of battery 38. As described above, DOD indicates the percentage of battery 38 that has been discharged relative to the overall capacity of battery 38. Over time, as battery 38 continues to provide power to the components of device 10, DOD increases (e.g., a higher DOD means less charge in battery 38).

$V_{CELL}$ represents the voltage of the battery cell as a function of DOD and $V_{PMU}$ represents the voltage of the PMU(s) as a function of DOD. $V_{LVMS}$ may cause both $V_{CELL}$ and $V_{PMU}$ to dip even after system shutdown. For example, as shown in FIG. 3, both $V_{CELL}$ and $V_{PMU}$ dip after shutdown procedures have been initiated at $V=V_{MIN}$.

$V_{MIN \cdot PMU}$ represents a voltage limit of the PMU(s) in device 10. $V_{MIN \cdot CELL}$ represents a voltage limit of the battery cell house. If either $V_{MIN \cdot PMU}$ or $V_{MIN \cdot CELL}$ is violated, the system may malfunction (e.g., brownouts or unexpected power offs of device 10 and/or accelerated cell aging may occur).

Thus, $V_{MIN}$ should be selected so as to avoid either of these two conditions being violated. For example, $V_{MIN}$ may be selected so that neither $V_{CELL}$ nor $V_{PMU}$ violates the conditions (e.g., falls below $V_{MIN\text{-}PMU}$ or $V_{MIN\text{-}CELL}$) even when $V_{CELL}$ and $V_{PMU}$ dip after system shutdown.

Figure 4:
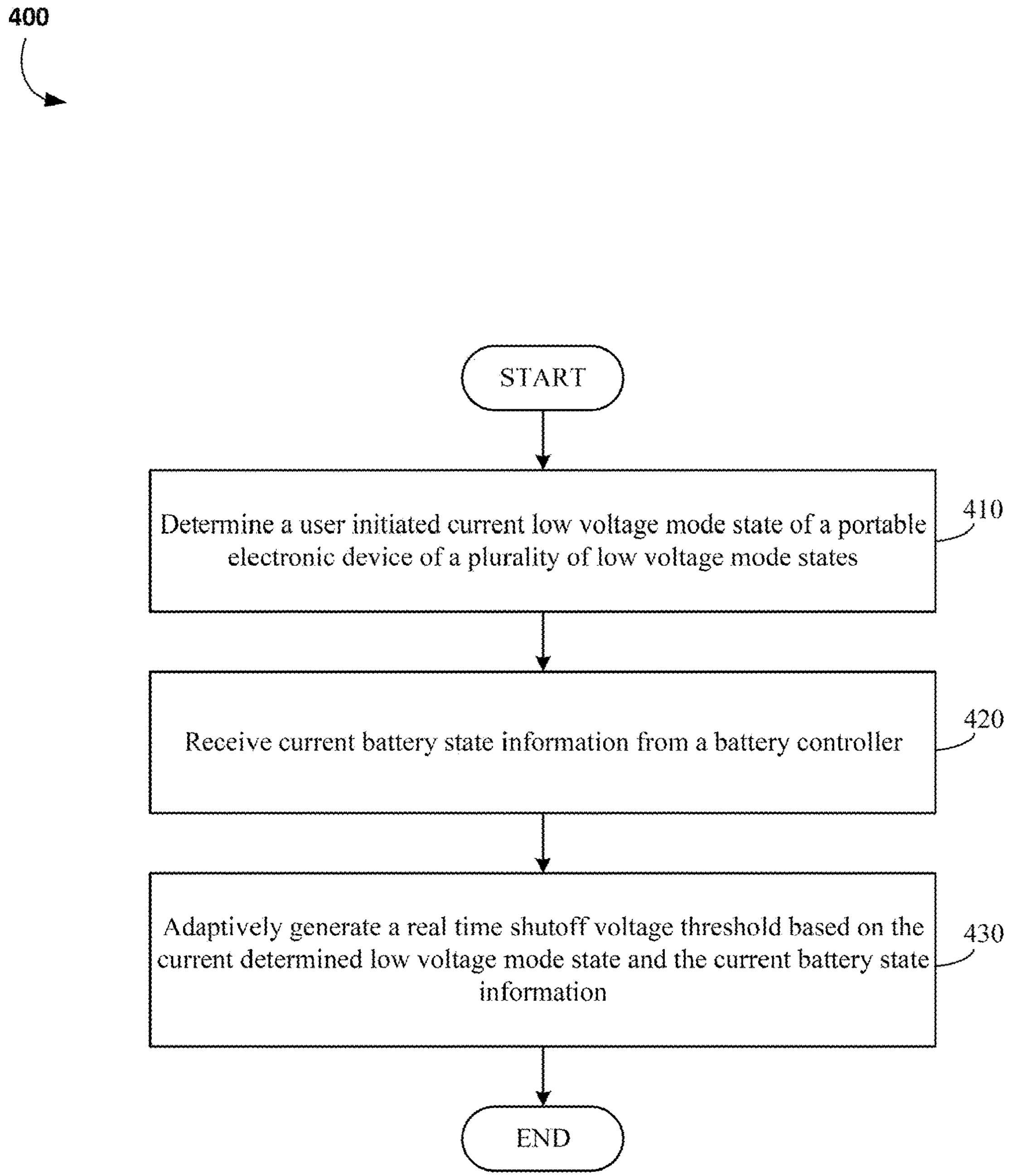
FIG. 4 is an example method for dynamically adjusting the shutdown voltage of an electronic device.

FIG. 4 is an example method for dynamically adjusting the shutdown voltage of an electronic device (e.g., device 10). These steps may be performed by, for example, system controller 36. As shown, at step 410 a user initiated current low voltage mode state of a portable electronic device of a plurality of low voltage mode states may be determined. For example, the user initiated current low voltage mode state may have been selected by a user of the portable electronic device via a display of the portable electronic device. The user initiated current low voltage mode state may have been selected from a plurality of low voltage mode states.

Each of the plurality of low voltage mode states may correspond to a state in which the portable electronic device provides at least one specific function after the portable electronic device has shut down. The at least one specific function may, for example, cause the portable electronic device to enable a user to access a car, a building, and/or a house using the portable electronic device after it has shut down. As another example, the at least one specific function may cause the portable electronic device to enable a user to locate the portable electronic device using another device after the portable electronic device has shut down. For example, a user may be able to view, on a display of another device, a geographic location of the portable electronic device after it has shut down. As another example, the at least one specific function may cause the portable electronic device to enable a user to make a mobile payment with the portable electronic device after it has shut down.

At step 420, current battery state information may be received from a battery controller (e.g., battery controller 39). Battery controller 39 obtains measurements from battery 38 in order to determine properties of battery 38 in real time. For example, battery controller 39 may determine real time battery state information including a current system load current draw, a current battery age (e.g., impedance), and a current battery temperature. System controller 36 may receive the real time battery state information from battery controller 39.

At step 430, a real time shutoff voltage threshold may be adaptively (e.g., repeatedly, continually, dynamically) generated based at least on the current determined low voltage mode state and the current real time battery state information. For example, a shutoff voltage determination model (e.g., shutoff voltage determination model 51) may repeatedly generate a real time shutoff voltage threshold so that the real time shutoff voltage threshold is always reflective of the current real time battery state information and the current low voltage mode state.

Figure 5:
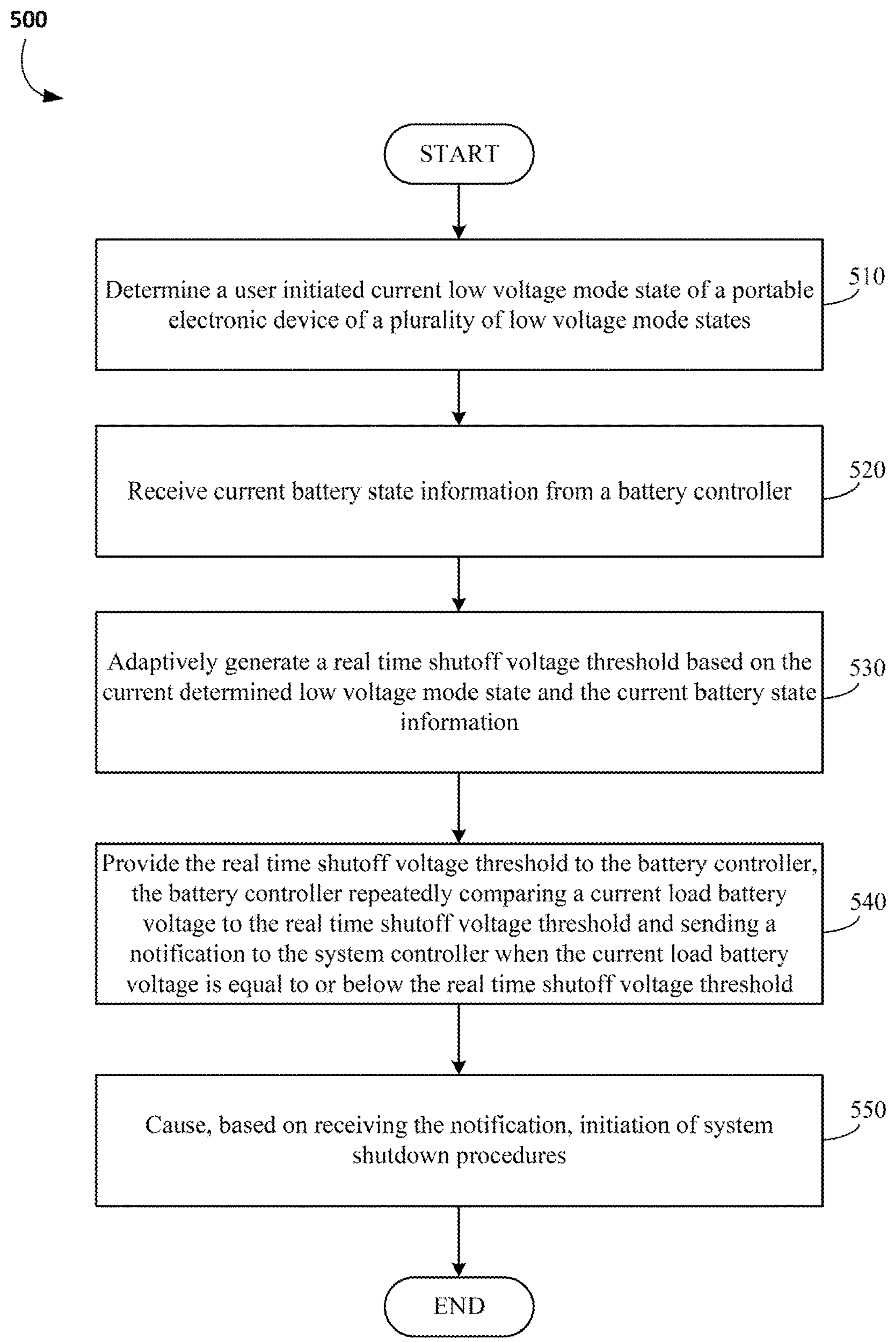
FIG. 5 is another example method for dynamically adjusting the shutdown voltage of an electronic device.

FIG. 5 is an example method for dynamically adjusting the shutdown voltage of an electronic device (e.g., device 10). These steps may be performed by, for example, system controller 36. As shown, at step 510 a user initiated current low voltage mode state of a portable electronic device of a plurality of low voltage mode states may be determined. For example, the user initiated current low voltage mode state may have been selected by a user of the portable electronic device via a display of the portable electronic device. The user initiated current low voltage mode state may have been selected from a plurality of low voltage mode states.

Each of the plurality of low voltage mode states may correspond to a state in which the portable electronic device provides at least one specific function after the portable electronic device has shut down. The at least one specific function may, for example, cause the portable electronic device to enable a user to access a car, a building, and/or a house using the portable electronic device after it has shut down. As another example, the at least one specific function may cause the portable electronic device to enable a user to locate the portable electronic device using another device after the portable electronic device has shut down. For example, a user may be able to view, on a display of another device, a geographic location of the portable electronic device after it has shut down. As another example, the at least one specific function may cause the portable electronic device to enable a user to make a mobile payment with the portable electronic device after it has shut down.

At step 520, current battery state information may be received from a battery controller (e.g., battery controller 39). Battery controller 39 obtains measurements from battery 38 in order to determine properties of battery 38 in real time. For example, battery controller 39 may determine real time battery state information including a current system load current draw, a current battery age (e.g., impedance), and a current battery temperature. System controller 36 may receive the real time battery state information from battery controller 39.

At step 530, a real time shutoff voltage threshold may be adaptively (e.g., repeatedly, continually, dynamically) generated based at least on the current determined low voltage mode state and the current real time battery state information. For example, a shutoff voltage determination model (e.g., shutoff voltage determination model 51) may repeatedly generate a real time shutoff voltage threshold so that the real time shutoff voltage threshold is always reflective of the current real time battery state information and the current low voltage mode state.

At 540, the real time shutoff voltage threshold may be provided to battery controller 39. Battery controller 39 may repeatedly compare a current load battery voltage to the real time shutoff voltage threshold. If the current load battery voltage is equal to or below the real time shutoff voltage threshold, battery controller 39 may send a notification to system controller 36. The notification may indicate to system controller 36 that the current load battery voltage is equal to or below the real time shutoff voltage threshold.

At 550, initiation of system shutdown procedures may be caused. For example, system controller 36 may cause initiation of system shutdown procedures based on receiving the notification from battery controller 39.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A portable electronic device comprising:
a battery;
a battery controller configured to determine real time battery state information associated with the battery, the real time battery state information including a system load current draw, a battery age indicator, and a battery temperature; and
a system controller configured to:
determine a user initiated current low voltage mode state of the portable electronic device of a plurality of low voltage mode states;
receive current battery state information from the battery controller; and
adaptively generate a real time shutoff voltage threshold based on the user initiated current low voltage mode state and the current battery state information.

2. The portable electronic device of claim 1, wherein the system controller is further configured to:
provide the real time shutoff voltage threshold to the battery controller, the battery controller repeatedly comparing a current load battery voltage to the real time shutoff voltage threshold and sending a notification to the system controller when the current load battery voltage is equal to or below the real time shutoff voltage threshold; and
cause, based on receiving the notification, initiation of system shutdown procedures.

3. The portable electronic device of claim 1, wherein each low voltage mode state of the plurality of low voltage mode states corresponds to a state in which the portable electronic device provides at least one specific function after the portable electronic device has been shut down.

4. The portable electronic device of claim 3, wherein the at least one specific function causes the portable electronic device to enable a user to access one of a car, a building, or a house using the portable electronic device.

5. The portable electronic device of claim 3, wherein the at least one specific function causes the portable electronic device to enable a user to locate the portable electronic device using another device.

6. The portable electronic device of claim 3, wherein the at least one specific function causes the portable electronic device to enable a user to make a mobile payment with the portable electronic device.

7. The portable electronic device of claim 1, wherein the real time shutoff voltage threshold indicates an amount of voltage that needs to be reserved for continued operation of the user initiated current low voltage mode state of the portable electronic device after the portable electronic device has been shut down.

8. The portable electronic device of claim 1, wherein the real time shutoff voltage threshold is directly proportional to an amount of voltage that that needs to be reserved for continued operation of the user initiated current low voltage mode state of the portable electronic device after the portable electronic device has been shut down.

9. The portable electronic device of claim 1, wherein the real time shutoff voltage threshold is inversely proportional to the system load current draw, directly proportional to the battery age indicator, and inversely proportional to the battery temperature.

10. The portable electronic device of claim 1, wherein the system controller is configured to adaptively generate the real time shutoff voltage threshold using a shutoff voltage determination model specifically adapted to the user initiated current low voltage mode state of the portable electronic device.

11. A system controller for use in a portable electronic device, the system controller configured to:
determine a user initiated current low voltage mode state of the portable electronic device of a plurality of low voltage mode states;
receive current battery state information from a battery controller, the battery controller configured to determine real time battery state information including a system load current draw, a battery age indicator, and a battery temperature; and
adaptively generate a real time shutoff voltage threshold based on the user initiated current low voltage mode state, and the current battery state information.

12. The system controller of claim 11, wherein the system controller is further configured to:
provide the real time shutoff voltage threshold to the battery controller, the battery controller repeatedly comparing a current load battery voltage to the real time shutoff voltage threshold and sending a notification to the system controller when the current load battery voltage is equal to or below the real time shutoff voltage threshold; and
cause, based on receiving the notification, initiation of system shutdown procedures.

13. The system controller of claim 11, wherein each low voltage mode state of the plurality of low voltage mode states corresponds to a state in which the portable electronic device provides at least one specific function after the portable electronic device has been shut down.

14. The system controller of claim 13, wherein the at least one specific function causes the portable electronic device to enable a user to access one of a car, a building, or a house using the portable electronic device.

15. The system controller of claim 13, wherein the at least one specific function causes the portable electronic device to enable a user to locate the portable electronic device using another device.

16. The system controller of claim 13, wherein the at least one specific function causes the portable electronic device to enable a user to make a mobile payment with the portable electronic device.

17. The system controller of claim 11, wherein the real time shutoff voltage threshold indicates an amount of voltage that that needs to be reserved for continued operation of the user initiated current low voltage mode state of the portable electronic device after the portable electronic device has been shut down.

18. The system controller of claim 17, wherein the real time shutoff voltage threshold is directly proportional to an amount of voltage that that needs to be reserved for continued operation of the user initiated current low voltage mode state of the portable electronic device after the portable electronic device has been shut down.

19. The system controller of claim 11, wherein the real time shutoff voltage threshold is inversely proportional to the system load current draw, directly proportional to the battery age indicator, and inversely proportional to the battery temperature.

20. The system controller of claim 11, wherein the system controller is configured to adaptively generate the real time shutoff voltage threshold using a shutoff voltage determination model specifically adapted to the user initiated current low voltage mode state of the portable electronic device.

* * * * *